Patented May 6, 1952

2,595,892

UNITED STATES PATENT OFFICE 2,595,892

ALKALI METAL ALKYLTOLUENE SULFONATES AS EMULSIFYING AGENTS IN LOW TEMPERATURE EMULSION POLYMERIZATION PROCESSES

Walter A. Schulze and Willie W. Crouch, Bartlesville, Okla., assignors to Phillips Petroleum Company, a corporation of Delaware No Drawing. Application December 9, 1948, Serial No. 64,426

10 Claims. (Cl. 260—83.7)

This invention relates to the production of polymeric materials of high molecular weight by polymerization of a monomeric material while dispersed in aqueous emulsion. The invention also relates to the use of certain specific aromatic sulfonates as improved emulsifying agents in effecting emulsion polymerization of monomeric materials.

In the production of rubber-like elastomers various polymerization recipes have been developed in order to provide polymers of superior physical properties. Variations in operating techniques have also been introduced in order to effect further improvements in the properties of the product. Recent developments have shown that synthetic elastomers having greatly improved properties may be obtained if polymerization reactions are effected at low temperatures. Since conversion rates generally decrease rapidly as the temperature is decreased, faster recipes are necessary in order that these reactions may be carried out on a practical basis. In order to accomplish the desired results at lower temperatures, a number of polymerization recipes have been provided. Outstanding among these are those in which a peroxide or hydroperoxide is a key component, and those in which a diazothioether is a key component. The peroxides and hydroperoxides are usually used in redox recipes, which include a combination of an oxidant, a reductant, and an oxidation catalyst. In this type of recipe the peroxide or hydroperoxide is the oxidant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like. As the oxidant in such a recipe, there may be used an inorganic peroxide, such as hydrogen peroxide, a pernitrate, a persulfate, a permanganate, or the like, or an organic peroxide such as benzoyl peroxide, or an organic hydroperoxide such as tertiary butyl hydroperoxide, methyl cyclohexyl hydroperoxide, or cumene hydroperoxide. In another type of recipe a diazothioether is the key component, and while it may be used alone, it is preferably used in combination with a water-soluble ferricyanide which is a salt of a monovalent cation, such as ammonium or an alkali metal. In all of these recipes, it is usually desirable to include a modifier, such as a mercaptan, an emulsifying agent such as a soap, or other known emulsifying agents, and various other ingredients which improve the qualities of the resulting latex or of the final rubber product.

Some of the more recent developments have revealed that polymers prepared by low temperature emulsion polymerization methods are preferred to those produced at higher temperatures. Emulsifying agents comprising salts of fatty acids or rosin acids have been widely used in polymerization processes but they have not been entirely satisfactory. When fatty acid soaps are employed, fatty acids remain in the product and their presence is deleterious, particularly as regards aging characteristics. Rosin acid soaps are not applicable in certain polymerization recipes when the reactions are carried out at low temperatures, particularly at temperatures below 0° C. Another disadvantage of many of the emulsifying agents is that they tend to gel at low temperatures. In many instances the latices are very viscous and the tendency toward gelation is pronounced.

We have now found a method whereby emulsion polymerization reactions can be carried out at low temperatures and the disadvantages attending the use of the above mentioned emulsifying agents eliminated. The method comprises the use of selected alkali metal alkyltoluene sulfonates as emulsifying agents in antifreeze emulsion systems. When operating in this manner polymerization is effected readily to produce fluid latices, gelation is prevented, and fatty acid-free polymers are obtained.

When emulsion polymerizations are carried out at low temperatures, such as below 0° C., it is necessary that special systems or media be provided in which the reactions can take place. We use various aqueous alcohol solutions, which we have chosen to designate as antifreeze emulsion systems, and we have discovered that through the use of our alkyltoluene sulfonates in these systems polymerizations can be carried out in a convenient and efficient manner at good conversion rates to produce fluid latices in which gelation is prevented. The products thus obtained are free from fatty acids and show excellent retention of physical properties, particularly after aging.

An object of this invention is to provide an improved process for the polymerization of a monomeric material while dispersed in aqueous emulsion.

A further object of this invention is to effect polymerization of monomeric materials in aqueous emulsion while at a subfreezing temperature.

Another object of our invention is to produce a synthetic rubber free from fatty acid.

Still another object of our invention is to produce synthetic rubber.

Further objects and advantages of our invention will become apparent, to one skilled in the art, from the accompanying disclosure and discussion.

The emulsifying agents herein employed are alkali metal salts of sulfonated aromatic hydrocarbons wherein only one benzene nucleus is present and wherein the substituents comprise a methyl group and a long-chain aliphatic group, the total number of carbon atoms in the sulfonate being within the range from about sixteen to about thirty. In order to be applicable in this invention, these alkyltoluene sulfonates are carefully separated from coproduct materials with which they are normally associated. Aromatic sulfonates in which one of the alkyl substituents is a long-chain group are superior as emulsifiers to those containing short-chain aliphatic radicals. While the invention is not dependent upon an explanation of this difference, one reason for this behavior may lie in the solubility of the compounds. The solubility in the dispersing medium must be great enough that the emulsifier is held in solution at the temperature of operation and yet be of such nature that micelles are formed. The alkyltoluene sulfonates herein described possess these characteristics. The formation of micelles, in the emulsion polymerization mixture, is believed to be essential, particularly in the early stages of an emulsion polymerization reaction. The amount of sulfonate is usually between 1 and 10 parts, more preferably 2 to 8 parts, by weight per 100 parts by weight of monomeric material.

Aromatic sulfonates containing two alkyl substituents have been described in the prior art, but the alkyl groups are identical and each group may contain a maximum of only eight carbon atoms. Sodium diisobutylbenzene sulfonate is an example of this type of emulsifying agent. The emulsifying agents of the present invention are quite different from those previously described, the benzene nucleus containing one methyl group and one long-chain aliphatic radical. Furthermore the alkyltoluene sulfonates herein described are separated from coproduct materials which are normally present as products of the process by which they are produced, and this point is of major significance. This procedure is contrary to that generally practiced in which the sulfonated alkylates in admixture with various other ingredients are employed as emulsifying agents.

The alkyltoluene sulfonates are conveniently prepared by the alkylation of toluene with long chain olefins boiling in the range from 320 to 500° F., i. e. having about nine to about twenty-three carbon atoms per molecule, followed by sulfonation of the alkylate. The sulfonated material is neutralized with an alkali, usually sodium or potassium hydroxide. Sulfonates prepared according to this general procedure have molecular weights in the range between 320 and 500.

In the preparation of alkylaromatic sulfonates, including the alkyltoluene sulfonates used in the process of this invention, there are certain coproduct materials associated therewith which result from normal alkylation and sulfonation procedures. These materials, which comprise salts such as alkali metal sulfates, unsulfonated oils, and the like are, according to general practice, allowed to remain in admixture with the sulfonates and the total products employed as the emulsifying agents. This is the case with many of the commercially available sulfated and sulfonated products which we have found inapplicable in our process. We have discovered that these associated products are deleterious when introduced into a polymerization reaction and especially so when the polymerization is carried out at low temperatures in antifreeze emulsion systems. Their presence causes a marked retardation in the conversion rate and in many instances the effect is so pronounced that polymerization is substantially completely inhibited. We have discovered further that by removing these associated materials from the sulfonated hydrocarbon products polymerization will proceed smoothly and at a surprisingly high rate to yield products of the quality desired.

The removal of coproduct materials, such as alkali metal sulfates and unsulfonated oils from alkyltoluene sulfonates, may be accomplished by any suitable method. In one procedure which is both convenient and effective the sulfonated hydrocarbon mixture is diluted with isopropyl alcohol, whereupon the alkali metal sulfate which is insoluble separates and is removed by filtration or any other means desired. Removal of the unsulfonated oil is accomplished by extraction with a hydrocarbon solvent such as pentane. The raffinate is dried to recover the desalted, deoiled product.

Any of the alkali metals are applicable for the preparation of the alkyltoluene sulfonates of this invention. However, sodium or potassium salts are most generally preferred. In some instances potassium salts are preferred since latices produced in their presence have a tendency toward greater fluidity, particularly when operating in the lower temperature ranges, such as below —10° C. Any of these emulsifying agents, however, are highly advantageous for low temperature polymerization in antifreeze emulsion systems, particularly since they prevent gelation of the latex.

The antifreeze emulsion systems in which the alkyltoluene sulfonates of this invention are employed comprise emulsions in which alcohol solutions are provided as the non-hydrocarbon phase. The concentration of the solutions may be varied with the alcohol employed, the temperature of operation, and the recipe used for effecting the polymerization. The term "alcohol" is used broadly to include water-soluble aliphatic compounds containing one or more hydroxyl groups such as methanol, glycerin, ethylene glycol, erythritol, and the like. In general the alcohol content of these alcohol solutions will lie in the range between 10 and 50 per cent.

The alkali metal alkyltoluene sulfonates herein described, after being separated from materials associated therewith, are applicable as emulsifying agents in various low temperature antifreeze emulsion systems, as herein discussed and illustrated. Redox recipes are those in which selected combinations of oxidizing and reducing agents are present. The diazo thioether-ferricyanide-mercaptan and the peroxide-redox recipes are most frequently preferred. In the latter case polymerizations may be effected in either the presence or absence of an organic reducing agent, such as a reducing sugar or other easily oxidizable polyhydroxy compound.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, nitrile, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methyl chloroprene (2-chloro-3-methyl-1,3-butadiene), and the like; aryl olefins such as styrene, various alkyl styrenes, p-chloro styrene, p-methoxy styrene, alpha-methyl styrene, vinyl naphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinyl furane, vinyl carbazole, vinyl acetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil in water" type, with the ratio of aqueous medium to monomeric material between about 1.5:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

As hereinbefore stated, the major advantages of this invention are obtained when carrying out polymerization reactions at low temperatures, and for accomplishing the results desired selected alkyltoluene sulfonates which have been separated from coproduct materials are employed in systems of the anti-freeze emulsion type. Temperatures may range from 0 to —30° C., with temperatures below —5° C. being most generally preferred.

The polymers produced according to this preferred process have numerous advantages. They are free from fatty acids and therefore the harmful effects so generally observed when appreciable amounts of fatty acids are present, particularly under aging conditions, are eliminated. In low temperature polymerizations latices are frequently very viscous or tend to "set up," or form a gel, but when the method of this invention is employed fluid latices are obtained.

While this invention has been described with reference to alkali metal alkyltoluene sulfonates as the sole emulsifying agents, mixtures of emulsifying agents may be employed if desired. For example, mixtures of fatty acid soaps or a soap of a rosin acid, such as sodium or potassium salts of lauric, oleic, abietic, tetrahydroabietic, and myristic acids, with alkyltoluene sulfonates may be employed in some instances. However, the great improvement which results from the use of these selected alkali metal alkyltoluene sulfonates in the anti-gelling characteristics of the latex and in the aging properties of the polymer will be reduced in proportion to the amount of the said sulfonates which are substituted by the fatty acid soaps.

Advantages of this invention are illustrated by the following examples. The reactants, and their proportions, and the other specific ingredients of the recipes are presented as being typical and should not be construed to limit the invention unduly.

*Example I*

A sodium alkyltoluene sulfonate (SATS) having an average molecular weight of about 360, corresponding approximately to the formula $C_{12}H_{25}.C_6H_3(CH_3)SO_3Na$, was used as the emulsifying agent in the following diazothioether recipe:

|  | Parts by weight |
|---|---|
| Butadiene | 70 |
| Styrene | 30 |
| Methanol solution (25% in water) | 250 |
| SATS | 5.0 |
| 2-(4-Methoxybenzenediazomercapto) naphthalene | 0.3 |
| Potassium ferricyanide | 0.3 |
| Mercaptan blend [1] | 0.4 |

[1] A blend of tertiary $C_{12}$, $C_{14}$, and $C_{16}$ mercaptans in a ratio of 3:1:1 parts by weight.

Coproduct materials, sodium sulfate and unsulfonated oil, were separated from the sodium alkyltoluene sulfonate prior to its use in carrying out the polymerization and the pH of the emulsifying agent was adjusted to 11.8 by the addition of excess potassium hydroxide. Polymerization was effected at —10° C. A 57.5 per cent conversion was obtained in 21.3 hours. A fluid, nongelled latex was obtained. Similar results were obtained using purified potassium alkyltoluene sulfonate.

In contrast to the above polymerization, a similar reaction was carried out in which the sodium alkyltoluene sulfonate employed contained unsulfonated oil which was present as a normal coproduct of the emulsifier preparation. A conversion of only 7.2 per cent was obtained in a 16-hour period.

To illustrate further the superiority of alkyltoluene sulfonate emulsifiers which are free from coproduct materials, additional polymerization runs were made using the following emulsifying agents in the above recipe, in place of the purified sodium alkyltoluene sulfonate. The following results were obtained after polymerization had continued 21.3 hours:

| Emulsifying Agent | Conversion, Per Cent |
|---|---|
| Daxad-11 (sodium salt of condensed alkyl aryl sulfonic acid). | 2.4 |
| Nekal NS (dibutylnapthalene sulfonate) | 1.5 |
| Triton N-100 (an alkylated aryl polyether alcohol) | 7.2 |

*Example II*

The recipe of Example I was followed except that 0.18 part of the mercaptan blend was used instead of 0.4 part and, in addition, one part of n-hexadecyl mercaptan was incorporated into the reaction mixture. Coproduct materials were carefully removed from the sodium alkyltoluene sulfonate as in the preceding example and the pH of the emulsifier adjusted to 11.0. A conversion of 57.0 per cent was realized in 16 hours and the latex was fluid and free from gel.

*Example III*

A mixed emulsifying agent comprising 5.0 parts potassium oleate and one part of the sodium alkyltoluene sulfonate used in Example I (SATS) was employed in the following polymerization recipe:

| | Parts by weight |
|---|---|
| Butadiene | 70 |
| Styrene | 30 |
| Methanol solution (20% in water) | 150 |
| Potassium oleate pH 10 | 5 |
| SATS | 1 |
| Mercaptan blend [1] | 0.25 |
| Cumene hydroperoxide, 100% | 0.17 |
| Sodium sulfate, anhydrous | 0.20 |
| Activator solution [2]: | |
|   Ferrous sulfate, $FeSO_4.7H_2O$ | 0.31 |
|   Sodium pyrophosphate, $Na_4P_2O_7.10H_2O$ | 0.70 |

[1] A blend of tertiary $C_{12}$, $C_{14}$, and $C_{16}$ mercaptans in a ratio of 3:3:1 parts by weight.
[2] The activator was prepared by dissolving 5.0 gm. $Na_4P_2O_7.10H_2O$ and 2.22 gm. $FeSO_4.7H_2O$ to make 100 ml. aqueous solution and heating the resulting mixture at 60° C. for 40 minutes.

The alkyltoluene sulfonate was separated from coproduct materials prior to use. Polymerization was carried out at a temperature of —10° C. At the end of 16.3 hours a conversion of 66.7 per cent was obtained. Similar results were obtained using purified potassium alkyltoluene sulfonate.

The effect of the presence of coproduct materials in sodium alkyltoluene sulfonate was shown by carrying out a polymerization reaction using the above recipe except that the alkyltoluene sulfonate contained 1.3 per cent unsulfonated oil. A conversion of only 19.1 per cent was obtained in a 16.3-hour reaction period.

The superiority of the alkyltoluene sulfonate is shown further by a series of polymerization runs in which a number of commercially available emulsifying agents are used, with the recipe otherwise the same as the foregoing. The emulsifying agents are as follows. The results obtained after a 16.3-hour polymerization period are shown in the following tabulation:

| Emulsifying Agent | Conversion, Per Cent |
|---|---|
| SA-178 (di-sec-butylnaphthalene sodium sulfonate) | 5.6 |
| Nacconol NRSF (an alkyl aryl sulphonate) | 5.5 |
| MP-189 (a petroleum hydrocarbon sulfonate) | 1.9 |
| Dreft (a fatty alcohol sulfate) | 0.3 |

*Example IV*

A polymerization run using a sodium alkyltoluene sulfonate having a molecular weight of about 375, (approximate formula), $$C_{13}H_{27}.C_6H_3(CH_3)SO_3Na$$

as the emulsifier was carried out using the following cumene hydroperoxide recipe at —10° C.

| | Parts by weight |
|---|---|
| Butadiene | 70 |
| Styrene | 30 |
| Glycerin solution (43% in water) | 180 |
| SATS | 5 |
| Mercaptan blend [1] | 0.25 |
| Cumene hydroperoxide, 100% | 0.17 |
| Sodium sulfate, anhydrous | 0.20 |
| Activator Solution [2] | |

[1] See Example I.
[2] See Example III.

A 61.9 per cent conversion was reached in a 17.6-hour reaction period.

*Example V*

The recipe of Example III was followed except that 5.0 parts of an emulsifying agent comprising a blend of 25 parts sodium alkyltoluene sulfonate with 75 parts of a 50/50 mixture of potassium laurate with potassium myristate was employed. The pH of the emulsifier composition was 9.5 and the polymerization temperature was —10° C. A conversion of 71.9 per cent was reached in 16.3 hours. The fluidity of the latex was greatly improved over that obtained when no sodium alkyltoluene sulfonate was present and gelation was prevented.

*Example VI*

Two polymer samples were prepared according to the recipe of Example IV except that in one case the emulsifier employed was potassium oleate while in the other case sodium alkyltoluene sulfonate (SATS) was used. The sample prepared using potassium oleate had a fatty acid content of 6.5 per cent while that produced in the run using the SATS was compounded with sufficient stearic acid to bring the fatty acid content up to 1.5 per cent. The following compounding recipe was employed.

| | Parts by weight |
|---|---|
| Elastomer | 100 |
| Channel black | 50 |
| Zinc oxide | 3 |
| Asphalt softener | 10 |
| Sulfur | 1.75 |
| Accelerator (N-cyclohexyl-2-benzothiazole sulfenamide) | 1.2 |

The samples were cured 30 minutes at 307° F. and physical tests made. Data are tabulated below.

| Emulsifying Agent | K oleate | SATS |
|---|---|---|
| Mooney, Raw | 52 | 58 |
| Mooney, Compounded | 90.0 | 99.8 |
| Stress-strain at 80° F.: | | |
| 300% Modulus, p. s. i | 1,060 | 760 |
| Tensile, p. s. i | 4,200 | 4,180 |
| Elongation, per cent | 695 | 750 |
| Stress-strain at 200° F.: | | |
| Tensile, p. s. i | 1,500 | 2,200 |
| Elongation, per cent | 400 | 570 |
| Hysteresis, ΔT, °F | 67.5 | 78.2 |
| Resilience, per cent | 61.9 | 61.5 |
| Flex Life (Thousands of Flexures to Failure) | 12.4 | 56.6 |

The following results were obtained when the sample was oven aged 24 hours at 212° F.

| Emulsifying Agent | K oleate | SATS |
|---|---|---|
| Stress-strain at 80° F.: | | |
| 300% Modulus, p. s. i | 1,700 | 1,740 |
| Tensile, p. s. i | 3,740 | 4,070 |
| Elongation, per cent | 505 | 550 |
| Hysteresis, ΔT, °F | 61.3 | 65.8 |
| Resilience, per cent | 66.2 | 66.8 |
| Flex Life (Thousands of Flexures to Failure) | 4.0 | 10.6 |

The above data shows the superiority in physical properties, particularly after aging, of the polymer prepared using sodium alkyltoluene sulfonate as the emulsifying agent. The tensile and flex life results at 200° F. and on the oven aged samples are the most important and significant properties. The flex life results are several-fold better for the polymer made with purified sodium alkyltoluene sulfonate than with potassium oleate.

*Example VII*

It is often desirable to incorporate a rosin acid in the finished polymers, and one way of doing this is to use an alkali metal soap of a rosin acid as an emulsifying agent. However, at low polymerization temperatures such a material has too marked a retarding effect upon the polymerization rate. By using a mixture of purified sodium alkyl toluene sulfonate and rosin acid soap much faster rates can be obtained, as illustrated by the following data.

| | Parts by weight |
|---|---|
| Butadiene | 72 |
| Styrene | 28 |
| Water | 180 |
| Emulsifying agent (total) | 4.7 |
| Cumene hydroperoxide | 0.10 |
| Mercaptan blend [1] | 0.25 |
| Ferrous sulfate, $FeSO_4.7H_2O$ | 0.14 |
| Potassium pyrophosphate, $K_4P_2O_7$ | 0.165 |
| Trisodium phosphate, $Na_3PO_4.12H_2O$ | 0.5 |
| Dextrose | 1.0 |

[1] A blend of tertiary $C_{12}$, $C_{14}$, and $C_{16}$ aliphatic mercaptans in a ratio of 3:1:1 parts by weight.

A series of polymerization runs was carried out at 5° C. using various mixtures of rosin soap (potassium salt) with the SATS used in Example I. A control run was made using rosin soap alone as the emulsifying agent. The following data were obtained:

| Run No. | SATS Added, Parts | Conversion at 7.0 Hours, Per Cent |
|---|---|---|
| I | 0 (Control) | 32 |
| II | 0.25 | 36 |
| III | 0.50 | 38 |
| IV | 1.00 | 45 |
| V | 2.0 | 51 |
| VI | 3.0 | 56 |

Runs IV and V were repeated and the polymerizations allowed to continue for 23 hours. The conversions reached were 92 and 91 per cent, respectively.

*Example VIII*

The following recipe was employed for carrying out a butadiene/styrene copolymerization at −10° C.

| | Parts by weight |
|---|---|
| Butadiene | 70 |
| Styrene | 30 |
| Water | 200 |
| Methanol | 50 |
| Emulsifier, pH 11.1 [1] | 5.0 |
| 2′-(4-Methoxybenzene diazomercapto)-naphthalene | 0.3 |
| Potassium ferricyanide | 0.3 |
| n-$C_{16}$ mercaptan | 1.0 |
| tert-$C_{14}$ mercaptan | 0.18 |

[1] A mixture of 2.5 parts potassium tetrahydroabietate and 2.5 parts SATS (see Example I).

A conversion of 55 per cent was reached in 23 hours.

*Example IX*

The following recipe was employed for carrying out the copolymerization of butadiene with styrene at −10° C.

| | Parts by weight |
|---|---|
| Butadiene | 70 |
| Styrene | 30 |
| Water | 154 |
| Glycerin | 66 |
| Emulsifier, pH 11.1 [1] | 5.0 |
| Cumene Hydroperoxide, 100% | 0.72 |
| Ferrous Sulfate, $FeSO_4.7H_2O$ | 0.62 |
| Sodium Pyrophosphate, $Na_4P_2O_7.10H_2O$ | 1.40 |
| Mercaptan Blend [2] | 0.5 |

[1] A mixture of 2.5 parts potassium tetrahydroabietate and 2.5 parts SATS (see Example I).
[2] A blend of tertiary $C_{12}$, $C_{14}$, and $C_{16}$ aliphatic mercaptans in a ratio of 3:1:1 parts by weight.

A conversion of 97 per cent was obtained after the reaction was allowed to continue 25.4 hours.

As will be evident to those skilled in the art, various modifications of this invention can be made, or followed, in the light of the foregoing disclosure and discussion, without departing from the spirit or scope of the disclosure or from the scope of the claims.

We claim:

1. In the production of a synthetic rubber by copolymerizing in an aqueous emulsion in the presence of an emulsifying agent a monomeric material comprising 65 to 90 per cent by weight 1,3-butadiene and the remainder styrene, the aqueous medium of said emulsion comprising an organic alcohol as antifreeze agent, the improvement which comprises effecting said polymerization at a temperature between —30 and 0° C. in the presence of a sodium monoalkyl toluene sulfonate having nine to twenty-three carbon atoms in said monoalkyl group and free from coproduct materials comprising alkali metal sulfates and unsulfonated oils, as said emulsifying agent, in an amount between two and eight parts by weight per 100 parts of said monomeric material with a ratio of aqueous medium to monomeric material between 1.5:1 and 2.75:1 by weight.

2. The improvement of claim 1 wherein said emulsifying agent has the formula $$C_{12}H_{25}C_6H_3(CH_3)SO_3Na$$

3. The improvement of claim 1 wherein said emulsifying agent has the formula $$C_{13}H_{27}C_6H_3(CH_3)SO_3Na$$

4. In the production of a synthetic rubber by polymerizing in an aqueous emulsion in the presence of an emulsifying agent a monomeric material comprising a conjugated diolefin, the aqueous medium of said emulsion comprising an organic alcohol as antifreeze agent, the improvement which comprises effecting said polymerization in the presence of a salt of a monoalkyl toluene sulfonic acid and of an alkali metal in which said monoalkyl group contains from nine to twenty-three carbon atoms and which is free from coproduct materials comprising alkali metal sulfates and unsulfonated oils, as an emulsifying agent, in an amount between one and ten parts by weight per 100 parts of said monomeric material, with a ratio of aqueous medium to monomeric material between 1.5:1 and 2.75:1 by weight.

5. In the production of a synthetic rubber by polymerizing in an aqueous emulsion in the presence of an emulsifying agent a monomeric material comprising 1,3-butadiene, the aqueous medium of said emulsion comprising an organic alcohol as antifreeze agent, the improvement which comprises effecting said polymerization in the presence of an alkali metal monoalkyl toluene sulfonate having nine to twenty-three carbon atoms in said monoalkyl group and free from coproduct materials comprising alkali metal sulfates and unsulfonated oils, as an emulsifying agent, in an amount between two and eight parts by weight per 100 parts of said monomeric material with a ratio of aqueous medium to monomeric material between 1.5:1 and 2.75:1 by weight.

6. The process of claim 5 wherein said alkali metal monoalkyl toluene sulfonate is used as an emulsifying agent together with an emulsifying agent comprising a soap of a carboxylic acid.

7. The process of claim 4 wherein said alkali metal monoalkyl toluene sulfonate is used as an emulsifying agent together with an emulsifying agent comprising a soap of a carboxylic acid.

8. In the production of a synthetic rubber by polymerizing in an aqueous emulsion in the presence of an emulsifying agent a monomeric material comprising a conjugated diolefin, the improvement which comprises effecting said polymerization at a polymerization temperature between —30 and 0° C. and in the presence of a mixture of a soap of a carboxylic acid and a salt of a monoalkyl toluene sulfonic acid and of an alkali metal in which said monoalkyl group contains from nine to twenty-three carbon atoms and which is free from coproduct materials comprising alkali sulfates and unsulfonated oils, as combined emulsifying agents, in a total amount between one and ten parts by weight per 100 parts of said monomeric material, with a ratio of aqueous medium to monomeric material between 1.5:1 and 2.75:1 by weight.

9. A process for the production of synthetic rubber, which comprises polymerizing a monomeric material comprising a conjugated diene while dispersed in an aqueous medium comprising an alcohol at a polymerization temperature between —30 and 0° C. and in the presence of an emulsifying agent comprising an alkali metal salt of a monoalkyltoluene sulfonic acid having nine to twenty-three carbon atoms in said monoalkyl group and free from coproduct materials comprising alkali metal sulfates and unsulfonated oils, in an amount between one and ten parts by weight of said monomeric material.

10. The process of claim 9 in which said emulsifying agent has the formula $$C_{12}H_{25}C_6H_3(CH_3)SO_3Na$$

WALTER A. SCHULZE.
WILLIE W. CROUCH.

REFERENCES CITED

The following references are of record in the file of this patent:

UNITED STATES PATENTS

| Number | Name | Date |
|--------|------|------|
| 2,375,140 | Semon | May 1, 1945 |

OTHER REFERENCES

Shearon et al., Industrial and Engineering Chemistry, May 1948, pp. 769–777.

Schulze et al., "Low Temperature Polymerization," Industrial Engineering Chemistry, vol. 41, August 1949, pages 1599–1603.